(12) United States Patent
Lee et al.

(10) Patent No.: US 12,505,873 B2
(45) Date of Patent: Dec. 23, 2025

(54) MEMORY DEVICE INCLUDING SENSE AMPLIFIER AND OFFSET CANCELLATION METHOD

(71) Applicant: SAMSUNG ELECTRONICS CO., LTD., Suwon-si (KR)

(72) Inventors: Changyoung Lee, Suwon-si (KR); Kyuchang Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 195 days.

(21) Appl. No.: 18/240,045

(22) Filed: Aug. 30, 2023

(65) Prior Publication Data

US 2024/0096402 A1 Mar. 21, 2024

(30) Foreign Application Priority Data

Sep. 16, 2022 (KR) ........................ 10-2022-0117247

(51) Int. Cl.
*G11C 7/06* (2006.01)
*G11C 11/4091* (2006.01)
*G11C 11/4094* (2006.01)

(52) U.S. Cl.
CPC ...... *G11C 11/4091* (2013.01); *G11C 11/4094* (2013.01)

(58) Field of Classification Search
CPC ... G11C 11/4091; G11C 5/06; G11C 11/4074; G11C 11/4093; G11C 7/1069; G11C 11/4096; G11C 7/1048; G11C 7/12
See application file for complete search history.

(56) References Cited

U.S. PATENT DOCUMENTS

| | | | |
|---|---|---|---|
| 6,594,187 B2 | 7/2003 | Ito | |
| 7,113,004 B2 | 9/2006 | Terzioglu et al. | |
| 9,202,531 B2 | 12/2015 | Seo | |
| 9,773,544 B2 | 9/2017 | Woo et al. | |
| 10,950,279 B2 | 3/2021 | Jeong et al. | |
| 11,024,365 B1* | 6/2021 | Seo ...................... | G11C 11/4091 |
| 11,594,264 B1* | 2/2023 | Chi ...................... | G11C 11/4094 |
| 2015/0036444 A1* | 2/2015 | Seo ...................... | G11C 11/4091 |
| | | | 365/210.1 |
| 2017/0069368 A1* | 3/2017 | Woo .................... | G11C 11/4094 |
| 2018/0182449 A1* | 6/2018 | Kim .................... | G11C 11/4094 |
| 2022/0028436 A1 | 1/2022 | Lu et al. | |

(Continued)

FOREIGN PATENT DOCUMENTS

| | | |
|---|---|---|
| CN | 112767975 B | 4/2022 |
| JP | 4138228 B2 | 8/2008 |

*Primary Examiner* — Mushfique Siddique
(74) *Attorney, Agent, or Firm* — Sughrue Mion, PLLC

(57) ABSTRACT

A sense amplifier includes a first isolation transistor connected to a first memory cell through a first bit line, a second isolation transistor connected to a second memory cell through a second bit line, and sense amplifying circuitry connected to the first memory cell through the first isolation transistor, connected to the second memory cell through the second isolation transistor, and latch, to a pair of sense bit lines, data corresponding to a cell voltage stored in the first memory cell or the second memory cell, wherein the sense amplifying circuitry is configured to perform an offset cancellation operation while a charge sharing operation is performed between the first memory cell and the first bit line or between the second memory cell and the second bit line.

18 Claims, 10 Drawing Sheets

(56) References Cited

U.S. PATENT DOCUMENTS

| | | |
|---|---|---|
| 2022/0157369 A1 | 5/2022 | Kim |
| 2023/0238053 A1* | 7/2023 | Shang .................. G11C 11/4094 |
| | | 365/207 |

* cited by examiner

MEMORY DEVICE INCLUDING SENSE AMPLIFIER AND OFFSET CANCELLATION METHOD

CROSS-REFERENCE TO RELATED APPLICATION

This application is based on and claims priority under 35 U.S.C. § 119 to Korean Patent Application No. 10-2022-0117247, filed on Sep. 16, 2022, in the Korean Intellectual Property Office, the disclosure of which is incorporated by reference herein in its entirety.

BACKGROUND

1. Field

The embodiments of the disclosure relate to a sense amplifier, and more particularly, to a sense amplifier configured to read data at a high speed.

2. Description of Related Art

The advancement in technologies such as artificial intelligence and Internet of Things (IoT) increases the need for memory devices operating at a high speed.

One type of memory device, Dynamic Random Access Memory (DRAM), operates in a manner in which data is written and read according to electric charges stored in a cell capacitor of a memory cell. The DRAM may sense and amplify a voltage difference between bit lines by using a sense amplifier so that data may be read. To improve the data reading speed of the memory device, there is a need to improve the sensing and amplifying operation through the sense amplifier. In this regard, current sensing and amplifying operations are insufficient in speed and accuracy.

SUMMARY

The embodiments provide a sense amplifier capable of reading data at a high speed and a memory device including the sense amplifier.

According to one or more embodiments, a sense amplifier comprises: a first isolation transistor connected to a first memory cell through a first bit line; a second isolation transistor connected to a second memory cell through a second bit line; and sense amplifying circuitry connected to the first memory cell through the first isolation transistor, and connected to the second memory cell through the second isolation transistor, wherein the sense amplifying circuitry is configured to latch, to a pair of sense bit lines, data corresponding to a cell voltage stored in the first memory cell or the second memory cell, and wherein the sense amplifying circuitry is configured to perform an offset cancellation operation while a charge sharing operation is performed between the first memory cell and the first bit line or between the second memory cell and the second bit line.

The first isolation transistor is turned off by control circuitry in response to a start of the charge sharing operation, and the second isolation transistor is turned off by the control circuitry in response to the start of the charge sharing operation.

The pair of sense bit lines of the sense amplifying circuitry start being charged with a driving voltage by control circuitry in response to the start of the charge sharing operation.

The sense amplifying circuitry starts the offset cancellation operation in response to the pair of sense bit lines being charged with the driving voltage.

The sense amplifying circuitry comprises a first pair of sense transistors and a second pair of sense transistors, and the second pair of sense transistors are turned off by the control circuitry in response to the pair of sense bit lines being charged with the driving voltage.

The first isolation transistor is turned on with a fine driving voltage by control circuitry to initiate a charge transfer operation after the charge sharing operation has been completed, and the second isolation transistor is turned on with the fine driving voltage by the control circuitry to initiate the charge transfer operation after the charge sharing operation has been completed, wherein the fine driving voltage has a voltage level that is within a predetermined amount of a threshold voltage.

The fine driving voltage is set based on a voltage of the first bit line or the second bit line and the threshold voltage is a threshold voltage of the first isolation transistor or the second isolation transistor.

A memory device comprising: a first memory cell connected to a first bit line; a second memory cell connected to a second bit line; a first isolation transistor connected to the first memory cell through the first bit line; a second isolation transistor connected to the second memory cell through the second bit line; sense amplifying circuitry connected to the first memory cell through the first isolation transistor, and connected to the second memory cell through the second isolation transistor, and the sense amplifying circuitry configured to latch, to a pair of sense bit lines, data corresponding to a cell voltage stored in the first memory cell or the second memory cell; and control circuitry configured to control the first isolation transistor, the second isolation transistor, and the sense amplifying circuitry such that an offset cancellation operation is performed in the sense amplifying circuitry while a charge sharing operation is performed between the first memory cell and the first bit line or between the second memory cell and the second bit line.

The control circuitry is configured to turn off the first isolation transistor and the second isolation transistor and activate a first word line connected to the first memory cell or a second word line connected to the second memory cell to initiate the charge sharing operation.

The control circuitry is configured to, in response to a start of the charge sharing operation, start charging the pair of sense bit lines with a driving voltage.

In response to charging the pair of sense bit lines with the driving voltage, the control circuitry is configured to turn off at least one transistor of a plurality of transistors included in the sense amplifying circuitry such that the offset cancellation operation is performed.

The sense amplifying circuitry comprises a first pair of sense transistors and a second pair of sense transistors, and when the pair of sense bit lines are charged with the driving voltage, the control circuitry is configured to turn off the second pair of sense transistors.

The control circuitry is configured to control the first isolation transistor, the second isolation transistor, and the sense amplifying circuitry such that a sense operation and a restore operation are performed after the charge sharing operation has been completed.

The control circuitry is configured to control the first isolation transistor and the second isolation transistor such that a charge transfer operation is performed after the charge sharing operation has been completed.

The control circuitry is configured to turn on the first isolation transistor and the second isolation transistor at a fine driving voltage such that the charge transfer operation is performed, wherein the fine driving voltage includes a voltage value that is within predetermined amount of a threshold voltage.

The fine driving voltage is set based on a voltage of the first bit line or the second bit line and the threshold voltage is a threshold voltage of the first isolation transistor or the second isolation transistor.

The control circuitry is configured to control the first isolation transistor, the second isolation transistor, and the sense amplifying circuitry such that a sense operation and a restore operation are performed after the charge transfer operation has been completed.

An operating method of a memory device comprising a first memory cell, a second memory cell, a sense amplifier, and control circuitry, the operating method comprising: performing a pre-charge operation on a first bit line connected to the first memory cell, (ii) a second bit line connected to the second memory cell, and a pair of sense bit lines of the sense amplifier by turning on a first pair of sense transistors, a second pair of sense transistors, a first isolation transistor, and a second isolation transistor through the control circuitry, wherein the first pair of sense transistors, the second pair of sense transistors, the first isolation transistor, and the second isolation transistor are included in the sense amplifier; and performing a charge sharing operation between the first memory cell and the first bit line or between the second memory cell and the second bit line by turning off the first isolation transistor and the second isolation transistor through the control circuitry, wherein the performing of the charge sharing operation comprises: charging the pair of sense bit lines with a driving voltage; and in response to charging the pair of sense bit lines with the driving voltage, performing an offset cancellation operation by turning off the second pair of sense transistors.

The operating method further comprising, after the charge sharing operation has been completed, performing a charge transfer operation by turning on the first isolation transistor and the second isolation transistor with a fine driving voltage through the control circuitry, wherein the fine driving voltage has a voltage value that is within a predetermined amount of a threshold voltage.

The fine driving voltage is set based on a voltage of the first bit line or the second bit line and the threshold voltage is a threshold voltage of the first isolation transistor or the second isolation transistor.

BRIEF DESCRIPTION OF THE DRAWINGS

Embodiments of the present disclosure will be more clearly understood from the following detailed description taken in conjunction with the accompanying drawings in which.

DETAILED DESCRIPTION OF THE EMBODIMENTS

Hereinafter, one or more embodiments are described in detail with reference to the attached drawings.

According to one or more embodiments, a sense amplifier may perform an offset cancelation operation while a charge sharing operation is performed. In this case, as a first isolation transistor and a second isolation transistor of the sense amplifier are turned off during the charge sharing operation, the transfer of electric charges between sense amplifying circuitry and a memory cell may be blocked. As the above-described sense amplifier is used, the speed of sensing data stored in the memory cell may be significantly improved.

According to one or more embodiments, the sense amplifier may perform a charge transfer operation after the charge sharing operation. The first isolation transistor and the second isolation transistor may be finely turned on during the charge transfer operation, and thus, a difference in voltage levels of a pair of sense bit lines may increase. Accordingly, data stored in a memory cell may be rather accurately sensed.

Figure 1:
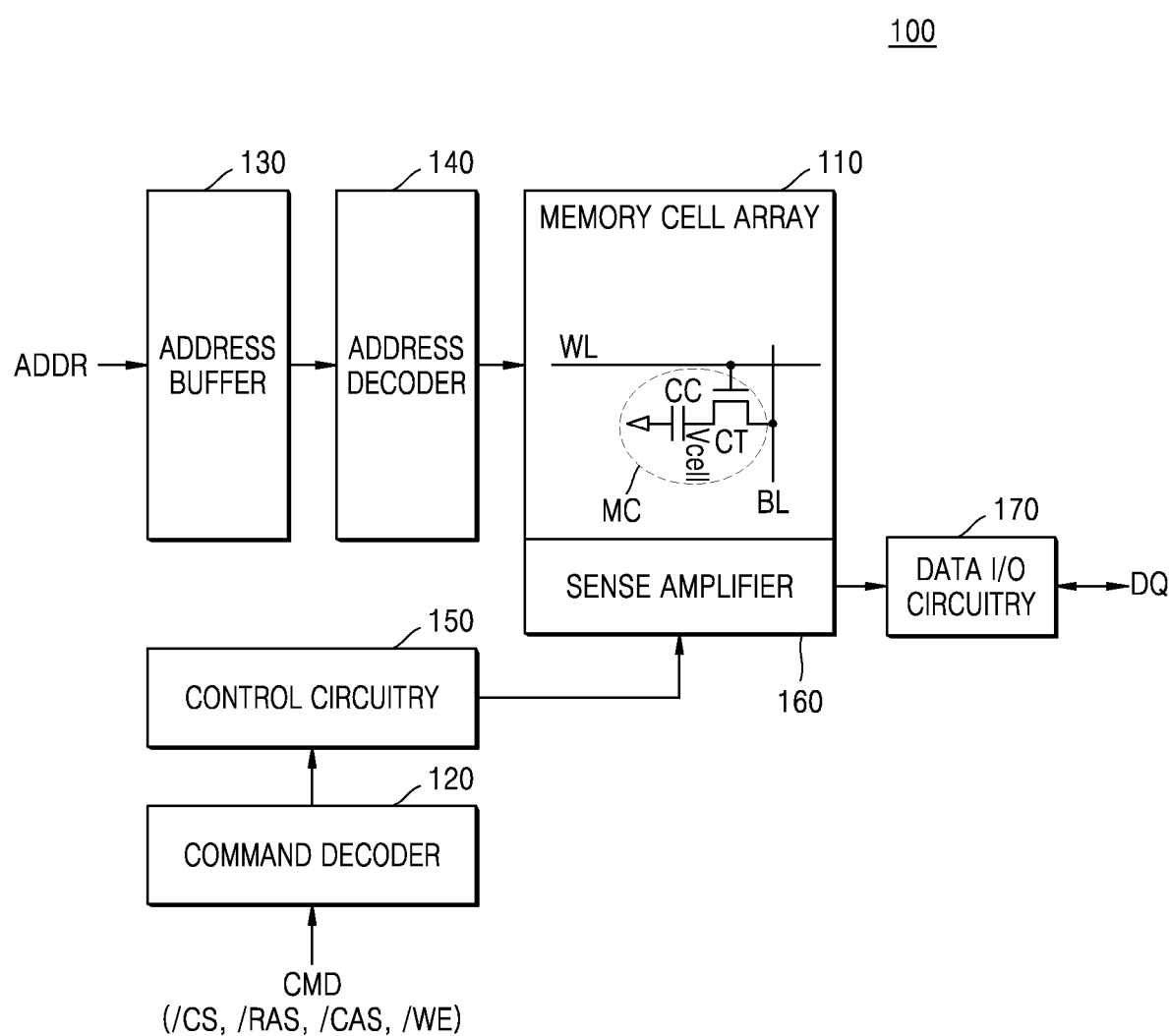
FIG. 1 is a block diagram of a memory device according to one or more embodiments.

FIG. 1 is a block diagram of a memory device according to one or more embodiments.

Referring to FIG. 1, according to one or more embodiments, a memory device 100 may include a memory cell array 110, a command decoder 120, an address buffer 130, an address decoder 140, control circuitry 150, a sense amplifier 160, and data input/output circuitry 170.

The memory device 100 may be Dynamic Random Access Memory (DRAM) sensing, as data, a cell voltage Vcell stored in a memory cell MC, and examples of the memory device 100 may include Synchronous DRAM (SDRAM), Double Data Rate SDRAM (DDR SDRAM), Low Power Double Data Rate SDRAM (LPDDR SDRAM), Graphics Double Data Rate SDRAM (GDDR SDRAM), DDR2 SDRAM, DDR3 SDRAM, DDR4 SDRAM, or any other memory structure known to one of ordinary skill in the art.

The memory device 100 may input/output data DQ in response to a command CMD and an address ADDR received from an external device (e.g., a central processing unit (CPU) or a memory controller).

The memory cell array 110 may include a plurality of memory cells MCs provided in a two-dimensional matrix form arranged in rows and columns. The memory cell array 110 may include a plurality of word lines WLs and a plurality of bit lines BLs respectively connected to the memory cells MCs. Each memory cell MC may include a cell transistor CT and a cell capacitor CC. A gate terminal of the cell transistor CT may be connected to one of the word lines WLs arranged in a row direction of the memory cell array 110. A first terminal of the cell transistor CT may be connected to one of the bit lines BLs arranged in a column direction of the memory cell array 110. A second terminal of the cell transistor CT may be connected to the cell capacitor CC. The cell capacitor CC may store electric charges, the capacity of which corresponds to data. The cell capacitor CC may be restored to the amount of electric charges, for example, a cell voltage Vcell, which corresponds to the data capacity.

The memory cell MC may store the cell voltage Vcell having a size to specify data in the cell capacitor CC. According to one or more embodiments, the memory cell MC may store multi-bit data of two or more bits.

The command decoder 120 may determine a command CMD by referring to a chip select signal /CS, a row address strobe signal /RAS, a column address strobe signal /CAS, a write enable signal /WE, and the like. The command decoder 120 may generate control signals corresponding to the command CMD. The command CMD may include an active command, a read command, a write command, a pre-charge command, or any other command known to one of ordinary skill in the art.

The address buffer 130 receives the address ADDR from an external device. The address ADDR may include a row address for addressing rows of the memory cell array 110 and a column address for addressing columns of the memory cell array 110. The address buffer 130 may transmit each of the row address and the column address to the address decoder 140.

The address decoder 140 may include a row decoder and a column decoder which select, in response to a received address ADDR, a word line WL and a bit line BL of a memory cell MC to be accessed. The row decoder may decode the row address and activate the word line WL of the memory cell MC that corresponds to the row address. The column decoder may decode the column address and provide a column select signal for selecting a bit line BL of a memory cell MC that corresponds to the column address.

The control circuitry 150 may control the sense amplifier 160 under control by the command decoder 120. The sense amplifier 160 may be a bit line sense amplifier (BLSA). The control circuitry 150 may control an operation of sensing the cell voltage Vcell of the memory cell MC of the sense amplifier 160. The control circuitry 150 may control the sense amplifier 160 to perform a pre-charge operation, a charge sharing operation, a charge transfer operation, a sense operation, a restore operation, or any other sense amplifier operations known to one of ordinary skill in the art. The control circuitry 150 may selectively turn on or off transistors (e.g., a first isolation transistor IT1, a second isolation transistor IT2, etc.), which are included in the sense amplifier 160 (FIG. 3), to enable the sense amplifier 160 to perform the operations stated above.

According to one or more embodiments, sense amplifier 160 may sense, as data, electric charges stored in the memory cell MC. The sense amplifier 160 may restore a bit line voltage, which may be generated according to the sensed data, as a cell voltage in a memory cell. Furthermore, the sense amplifier 160 may transmit data to the data input/output circuitry 170 so that the sensed data is output to the outside of the memory device 100 through a data pad.

The data input/output circuitry 170 may receive, from the outside, data DQ to be written on the memory cells MCs and transmit the data DQ to the memory cell array 110. The data input/output circuitry 170 may externally output bit data, which is sensed by the sense amplifier 160, as read data through the data pad.

Figure 2:
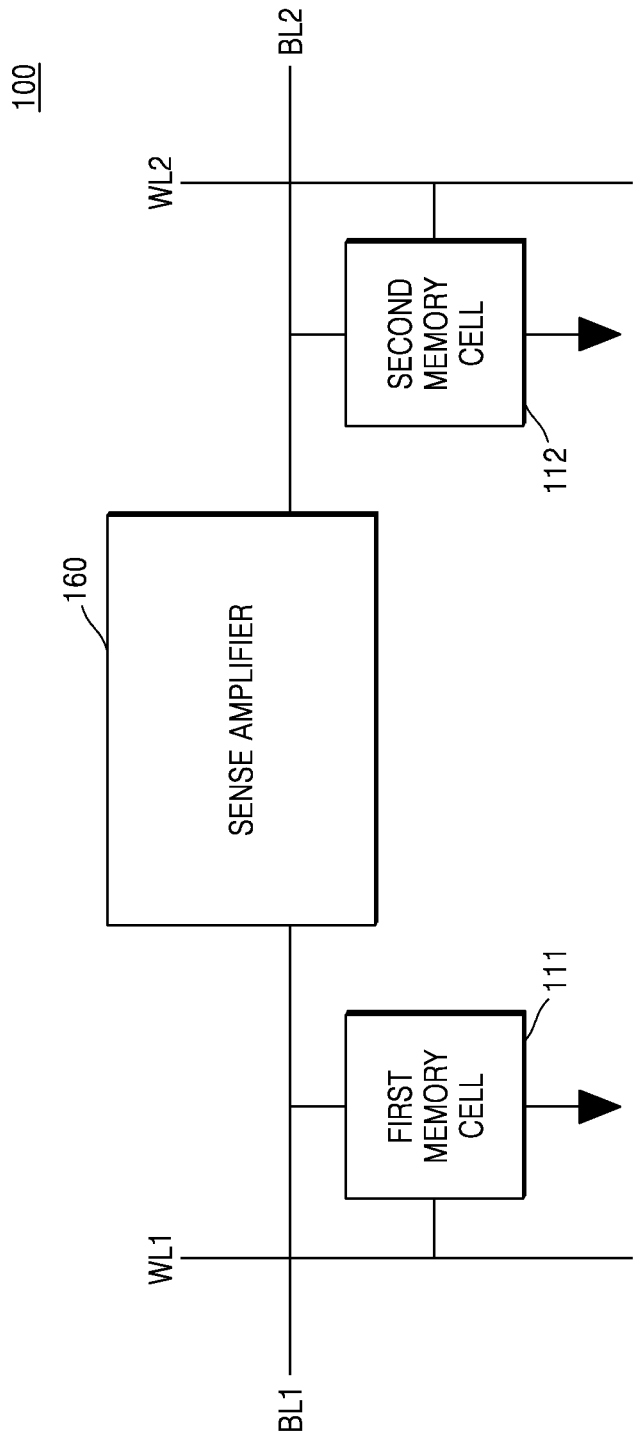
FIG. 2 is a block diagram showing a sense amplifier and a peripheral configuration of the sense amplifier, according to one or more embodiments.

FIG. 2 is a block diagram showing a sense amplifier and a peripheral configuration of the sense amplifier, according to one or more embodiments.

Referring to FIG. 2, the memory device 100 may include a first memory cell 111, a second memory cell 112, and the sense amplifier 160.

The first memory cell 111 may be connected to a first bit line BL1 and a first word line WL1. When the first word line WL1 is activated (e.g., voltage applied to WL1), a transfer between electric charges stored in a cell capacitor of the first memory cell 111 and electric charges charged in the first bit line BL1 may occur. Accordingly, data may be written on the first memory cell 111, or data stored therein may be read.

The second memory cell 112 may be connected to a second bit line BL2 and a second word line WL2. When the second word line WL2 is activated (e.g., voltage applied to WL2), a transfer between electric charges stored in the second memory cell 112 and electric charges charged in the second bit line BL2 may occur. Accordingly, data may be written on the second memory cell 112, or data stored therein may be read.

The sense amplifier 160 may be connected to the first memory cell 111 through the first bit line BL1. The sense amplifier 160 may be connected to the second memory cell 112 through the second bit line BL2. The sense amplifier 160 may sense and amplify voltage variations in the first bit line BL1 and the second bit line BL2.

Detailed structures and operations of the first memory cell 111, the second memory cell 112, and the sense amplifier 160 may be described in more detail with reference to FIG. 3.

Figure 3:
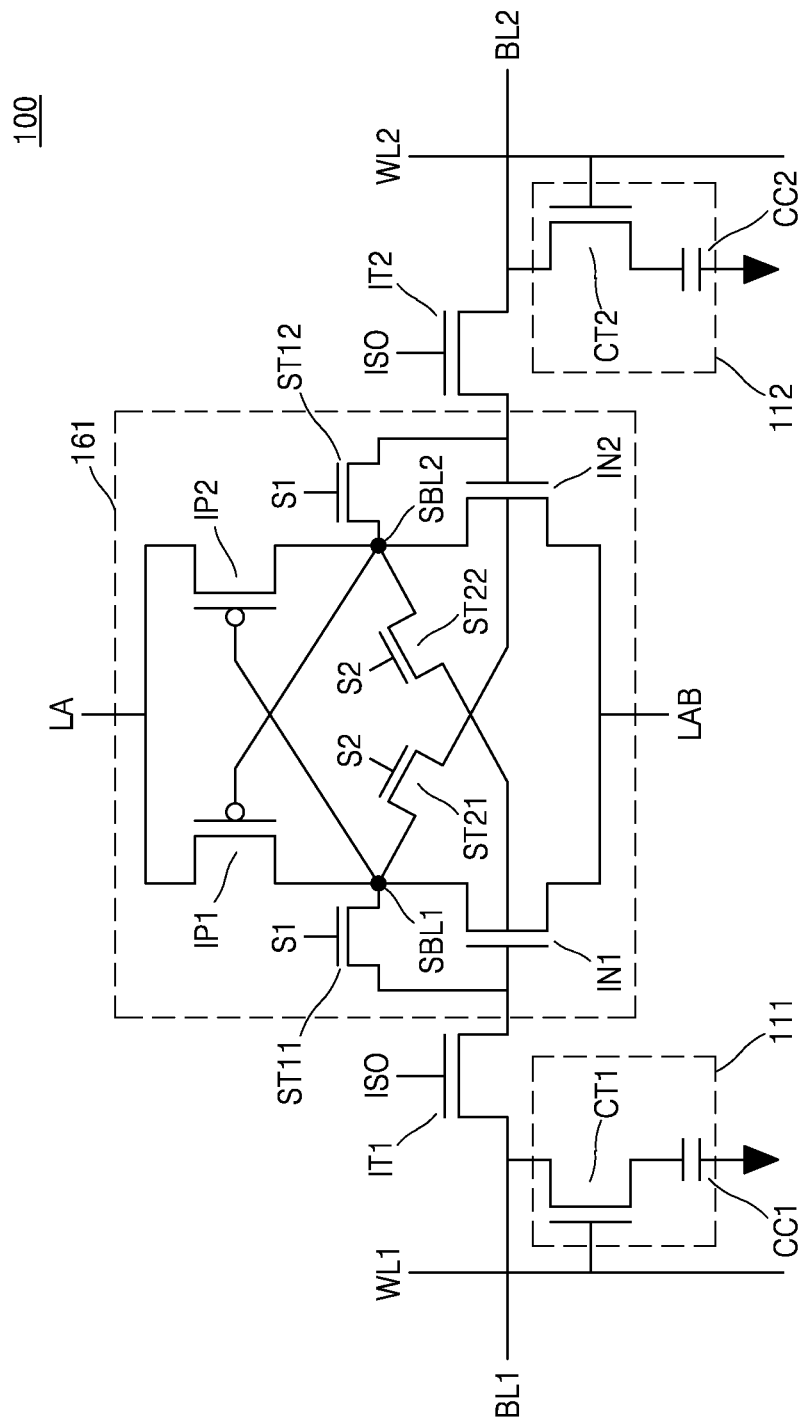
FIG. 3 is a circuit diagram showing a sense amplifier and a peripheral configuration of the sense amplifier, according to one or more embodiments.

FIG. 3 is a circuit diagram showing a sense amplifier and a peripheral configuration of the sense amplifier, according to one or more embodiments.

Referring to FIG. 3, the first memory cell 111 may include a first cell capacitor CC1 and a first cell transistor CT1.

A first terminal of the first cell capacitor CC1 may be connected to the first cell transistor CT1. A second terminal of the first cell capacitor CC1 may be connected to a ground node. The first cell capacitor CC1 may store electric charges, the capacity of which corresponds to data stored in the first cell capacitor CC1.

A gate terminal of the first cell transistor CT1 may be connected to the first word line WL1. A first terminal of the first cell transistor CT1 may be connected to the first bit line BL1. A second terminal of the first cell transistor CT1 may be connected to the first terminal of the first cell capacitor CC1.

The first cell transistor CT1 may be turned on as the first word line WL1 is activated. When the first cell transistor CT1 is turned on, the electric charges may be transferred between the first cell capacitor CC1 and the first bit line BL1 through the first cell transistor CT1.

The first cell transistor CT1 may be turned off as the first word line WL1 is inactivated. When the first cell transistor CT1 is turned off, the transfer of the electric charges between the first cell capacitor CC1 and the first bit line BL1 through the first cell transistor CT1 may be blocked (e.g., a channel between source and drain regions of a transistor is not present, thereby blocking the transfer of electric charges).

A second memory cell 112 may include a second cell capacitor CC2 and a second cell transistor CT2.

A first terminal of the second cell capacitor CC2 may be connected to the second cell transistor CT2. A second terminal of the second cell capacitor CC2 may be connected to the ground node. The second cell capacitor CC2 may store electric charges, the capacity of which corresponds to data stored in second cell capacitor CC2.

A gate terminal of the second cell transistor CT2 may be connected to the second word line WL2. A first terminal of the second cell transistor CT2 may be connected to the second bit line BL2. A second terminal of the second cell transistor CT2 may be connected to the first terminal of the second cell capacitor CC2.

The second cell transistor CT2 may be turned on as the second word line WL2 is activated. When the second cell transistor CT2 is turned on, the electric charges may be transferred between the second cell capacitor CC2 and the second bit line BL2 through the second cell transistor CT2.

The second cell transistor CT2 may be turned off as the second word line WL2 is inactivated (e.g., applied voltage is turned off). When the second cell transistor CT2 is turned off, the transfer of the electric charges between the second cell capacitor CC2 and the second bit line BL2 through the second cell transistor CT2 may be blocked.

The sense amplifier 160 may include a first isolation transistor IT1, a second isolation transistor IT2, and sense amplifying circuitry 161.

A gate terminal of the first isolation transistor IT1 may be connected to a terminal of an isolation signal ISO. A first terminal of the first isolation transistor IT1 may be connected to the first bit line BL1. A second terminal of the first isolation transistor IT1 may be connected to the sense amplifying circuitry 161. The first isolation transistor IT1 may be connected to the first memory cell 111 through the first bit line BL1.

The first isolation transistor IT1 may be turned on, turned off, or finely turned on in response to the isolation signal ISO received through the gate terminal of the first isolation transistor IT1. The process of finely turning on a transistor may include incrementally increasing a voltage to a gate of the transistor at a predetermined rate (e.g., V/ms), or applying a voltage to the gate of the transistor at a voltage level that is within a predetermined amount of a threshold.

A gate terminal of the second isolation transistor IT2 may be connected to the terminal of the isolation signal ISO. A first terminal of the second isolation transistor IT2 may be connected to the second bit line BL2. A second terminal of the second isolation transistor IT2 may be connected to the sense amplifying circuitry 161. The second isolation transistor IT2 may be connected to the second memory cell 112 through the second bit line BL2.

The second isolation transistor IT2 may be turned on, turned off, or finely turned on in response to the isolation signal ISO received through the gate terminal of the second isolation transistor IT2. The second isolation transistor IT2 may be finely turned on or off in a similar manner as described above with respect to the first isolation transistor IT1.

The isolation signal ISO may be applied by the control circuitry 150, and the control circuitry 150 may control the first isolation transistor IT1 and the second isolation transistor IT2 to be turned on, turned off, or finely turned on in response to the isolation signal ISO. For example, the control circuitry 150 may control the isolation signal ISO and thus, adjust the transfer of electric charges between the first memory cell 111 and the sense amplifying circuitry 161 through the first isolation transistor IT1, and adjust the transfer of electric charges between the second memory cell 112 and the sense amplifying circuitry 161 through the second isolation transistor IT2.

The control circuitry 150 may apply a driving voltage (e.g., about 1V) to the isolation signal ISO to turn on the first isolation transistor IT1 and the second isolation transistor IT2. When the first isolation transistor IT1 is turned on, the electric charges may be transferred between the first bit line BL1 and the sense amplifying circuitry 161. Furthermore, when the second isolation transistor IT2 is turned on, the electric charges may be transferred between the second bit line BL2 and the sense amplifying circuitry 161.

The control circuitry 150 may apply a ground voltage or a negative driving voltage (e.g., about −1 V) to the isolation signal ISO to turn off the first isolation transistor IT1 and the second isolation transistor IT2. When the first isolation transistor IT1 is turned off, the transfer of the electric charges between the first bit line BL1 and the sense amplifying circuitry 161 may be blocked (e.g., there is no conductive path between the first bit line BL1 and the sense amplifying circuitry 161). Furthermore, when the second isolation transistor IT2 is turned off, the transfer of the electric charges between the second bit line BL2 and the sense amplifying circuitry 161 may be blocked. In one or more examples, when the control circuitry 150 applies a negative driving voltage, instead of a ground voltage, to the isolation signal ISO, the first isolation transistor IT1 and the second isolation transistor IT2 may be turned off.

The control circuitry 150 may apply a fine driving voltage to the isolation signal ISO to finely turn on the first isolation transistor IT1 and the second isolation transistor IT2. The fine turning on may indicate a state in which a transistor is turned on at a slightly higher (e.g., predetermined amount) voltage than a threshold voltage of the transistor. In one or more examples, the fine driving voltage may be set based on a voltage of the first bit line BL1 or a voltage of the second bit line BL2 and a threshold voltage of the first isolation transistor IT1 or a threshold voltage of the second isolation transistor IT2. For example, a voltage difference between the fine driving voltage and a voltage of the first bit line BL1 may be set to be slightly greater than a threshold voltage of the first isolation transistor IT1.

When the first isolation transistor IT1 and the second isolation transistor IT2 are finely turned on, a voltage difference between a pair of sensing bit lines SBL1 and SBL2 described below may be clearly amplified.

The sense amplifying circuitry 161 may be connected to the first memory cell 111 through the first isolation transistor IT1. Furthermore, the sense amplifying circuitry 161 may be connected to the second memory cell 112 through the second isolation transistor IT2. The sense amplifying circuitry 161 may latch, to the sensing bit lines SBL1 and SBL2, data corresponding to the cell voltage stored in the first memory cell 111 or the second memory cell 112.

FIG. 3 shows an example of the sense amplifying circuitry 161 that may be applied to the sense amplifier 160 according to one or more embodiments, but one or more embodiments are not limited thereto. Hereinafter, one or more embodiments are described based on the example of the sense amplifying circuitry 161 of FIG. 3.

The sense amplifying circuitry 161 may be connected to a terminal of a sense driving signal LA and a terminal of a complementary sense driving signal LAB.

The sense amplifying circuitry 161 may include a first inverter formed of a first PMOS transistor IP1 and a first NMOS transistor IN1, a second inverter formed of a second PMOS transistor IP2 and a second NMOS transistor IN2, a first pair of sense transistors ST11 and ST12, and a second pair of sense transistors ST21 and ST22.

The first inverter may include the first PMOS transistor IP1 and the first NMOS transistor IN1.

A first terminal of the first PMOS transistor IP1 may be connected to the terminal of the sense driving signal LA. A second terminal of the first PMOS transistor IP1 may be connected to the first sense bit line SBL1. A gate terminal of the first PMOS transistor IP1 may be connected to the second sense bit line SBL2.

A first terminal of the first NMOS transistor IN1 may be connected to the first sense bit line SBL1. A second terminal of the first NMOS transistor IN1 may be connected to the terminal of the complementary sense driving signal LAB. A gate terminal of the first NMOS transistor IN1 may be connected to the second terminal of the first isolation transistor IT1.

The second inverter may include the second PMOS transistor IP2 and the second NMOS transistor IN2.

A first terminal of the second PMOS transistor IP2 may be connected to the terminal of the sense driving signal LA. A second terminal of the second PMOS transistor IP2 may be connected to the second sense bit line SBL2. A gate terminal of the second PMOS transistor IP2 may be connected to the first sense bit line SBL1.

A first terminal of the second NMOS transistor IN2 may be connected to the second sense bit line SBL2. A second terminal of the second NMOS transistor IN2 may be connected to the terminal of the complementary sense driving signal LAB. A gate terminal of the second NMOS transistor IN2 may be connected to the second terminal of the second isolation transistor IT2.

The first pair of sense transistors ST11 and ST12 may include a first sense transistor ST11 and a second sense transistor ST12.

A first terminal of the first sense transistor ST11 may be connected to the first sense bit line SBL1. A second terminal of the first sense transistor ST11 may be connected to the second terminal of the first isolation transistor IT1. A gate terminal of the first sense transistor ST11 may be connected to a terminal of a first sense signal S1.

A first terminal of the second sense transistor ST12 may be connected to the second sense bit line SBL2. A second terminal of the second sense transistor ST12 may be connected to the second terminal of the second isolation transistor IT2. A gate terminal of the second sense transistor ST12 may be connected to the terminal of the first sense signal S1.

The second pair of sense transistors ST21 and ST22 may include a third sense transistor ST21 and a fourth sense transistor ST22.

A first terminal of the third sense transistor ST21 may be connected to the second terminal of the second isolation transistor IT2. A second terminal of the third sense transistor ST21 may be connected to the first sense bit line SBL1. A gate terminal of the third sense transistor ST21 may be connected to a terminal of a second sense signal S2.

A first terminal of the fourth sense transistor ST22 may be connected to the second terminal of the first isolation transistor IT1. A second terminal of the fourth sense transistor ST22 may be connected to the second sense bit line SBL2. A gate terminal of the fourth sense transistor ST22 may be connected to the terminal of the second sense signal S2.

The operations of the first inverter including the first PMOS transistor IP1 and the first NMOS transistor IN1 and the second inverter including the second PMOS transistor IP2 and the second NMOS transistor IN2 may be controlled according to the sense driving signal LA and the complementary sense driving signal LAB transmitted from the control circuitry 150. The first pair of sense transistors ST11 and ST12 and the second pair of sense transistors ST21 and ST22 may be turned on or off according to the first sense signal S1 and the second sense signal S2, respectively. The first sense signal S1 and the second sense signal S2 may be transmitted from the control circuitry 150.

The control circuitry 150 may control the application of the isolation signal ISO, the sense driving signal LA, the complementary sense driving signal LAB, the first sense signal S1, and the second sense signal S2. Therefore, the control circuitry 150 may control a pre-charge operation, a charge sharing operation, a sense operation, and a restore operation to be sequentially performed in the sense amplifier 160. In one or more examples, the control circuitry 150 may control an offset cancellation operation to be performed while the charge sharing operation is performed in the sense amplifier 160.

The application of the isolation signal ISO, the sense driving signal LA, the complementary sense driving signal LAB, the first sense signal S1, and the second sense signal S2 by the control circuitry 150 and the operation of the sense amplifying circuitry 161 according to the application may be described in more detail with reference to the timing diagrams of FIGS. 4 to 7.

Figure 4:
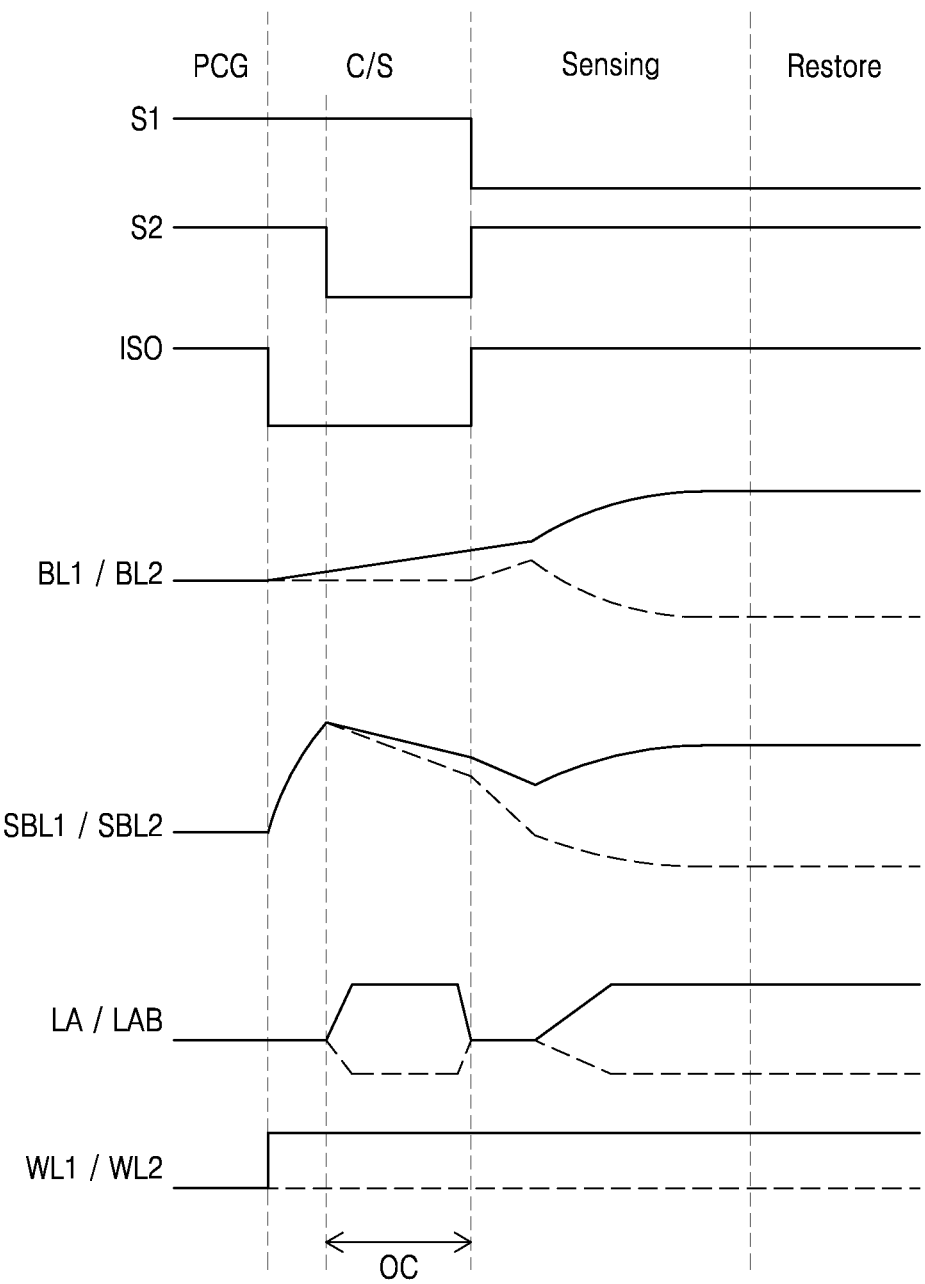
FIG. 4 is a timing diagram showing signals of a sense amplifier when data 1 is sensed by the sense amplifier, according to one or more embodiments.

FIG. 4 is a timing diagram showing signals of a sense amplifier when data 1 is sensed by the sense amplifier, according to one or more embodiments.

FIG. 4 shows flows of voltage levels of various signals and lines when data 1 stored in the first memory cell 111 is sensed.

In FIGS. 4 to 7, a voltage level of each of the first sense signal S1, the second sense signal S2, the isolation signal ISO, the first bit line BL1, the first sense bit line SBL1, the sense driving signal LA, and the first word line WL1 is indicated by a solid line, and a voltage level of each of the second bit line BL2, the second sense bit line SBL2, the complementary sense driving signal LAB, and the second word line WL2 is indicated by a dashed line.

The control circuitry 150 may control the sense amplifier 160 to perform the pre-charge operation (PGC), the charge sharing operation (C/S), the sense operation, and the restore operation in sequence, and the aforementioned operations are described in the stated order.

Pre-Charge Operation

When the pre-charge operation is performed, the control circuitry 150 may apply a driving voltage to the first sense signal S1, the second sense signal S2, and the isolation signal ISO. Accordingly, the first pair of sense transistors ST11 and ST12, the second pair of sense transistors ST21 and ST22, the first isolation transistor IT1, and the second isolation transistor IT2 may be turned on.

The control circuitry 150 may apply a pre-charge voltage to the sense driving signal LA and the complementary sense driving signal LAB. The pre-charge voltage may be set to have a voltage level (e.g., about 0.5 V) corresponding to half of the driving voltage level (e.g., about 1 V).

Furthermore, the control circuitry 150 may enable the first bit line BL1, the second bit line BL2, the first sense bit line SBL1, and the second sense bit line SBL2 to have a pre-charge voltage level by pre-charging the first bit line BL1, the second bit line BL2, the first sense bit line SBL1, and the second sense bit line SBL2. In one or more examples, because the first word line WL1 and the second word line WL2 are inactive, the first word line WL1 and the second word line WL2 may each have a ground voltage level.

Charge Sharing Operation (Before the Offset Cancellation Operation Starts)

When the charge sharing operation starts, a word line among of the first word line WL1 and the second word line WL2 may be activated, where the activated word line may be connected to a memory cell storing therein data to be sensed. Because FIG. 4 corresponds to one or more embodiments in which data stored in the first memory cell 111 is sensed, the first word line WL1 may be activated and thus, have a driving voltage level, whereas the second word line WL2 may remain inactive and thus, have a ground voltage level. The driving voltage level may be greater than the ground voltage level. The voltage level of each of the first word line WL1 and the second word line WL2 may be maintained until a restore operation described below is performed.

When the charge sharing operation starts, the control circuitry 150 may apply a ground voltage to the isolation signal ISO. Accordingly, the first isolation transistor IT1 and the second isolation transistor IT2 may be turned off. In one or more examples, as the first isolation transistor IT1 and the second isolation transistor IT2 are turned off, the transfer of electric charges between the first memory cell 111 and the sense amplifying circuitry 161 and between the second memory cell 112 and the sense amplifying circuitry 161 may be blocked.

The control circuitry 150 may maintain the first sense signal S1, the second sense signal S2, the sense driving signal LA, and the complementary sense driving signal LAB to have the same levels as those during the pre-charge operation.

In one or more examples, as the first word line WL1 is activated, the first cell transistor CT1 is turned on, and thus, the electric charges may be transferred between the first cell capacitor CC1 and the first bit line BL1. FIG. 4 corresponds to one or more embodiments in which data 1 is stored in the first memory cell 111, and thus, the voltage level of the first cell capacitor CC1 may be higher than that of the first bit line BL1 pre-charged. Therefore, the electric charges stored in the first cell capacitor CC1 may be transferred to the first bit line BL1, and the voltage level of the first bit line BL1 may gradually increase. The gradual increase may be performed at a rate that does not exceed a predetermined rate.

In contrast, because the second word line WL2 is inactivated, the second cell transistor CT2 is turned off, and thus, the transfer of the electric charges between the second cell capacitor CC2 and the second bit line BL2 may be advantageously prevented. Therefore, the voltage level of the second bit line BL2 may be maintained at the pre-charge voltage level.

When the charge sharing operation starts, the control circuitry 150 may increase the voltage level of each of the first sense bit line SBL1 and the second sense bit line SBL2 to the driving voltage level.

Charge Sharing Operation (after the Offset Cancellation Operation Starts)

When the voltage level of each of the first sense bit line SBL1 and the second sense bit line SBL2 increases to the driving voltage level as the charge sharing operation starts, the control circuitry 150 may start the offset cancellation operation (OC).

The control circuitry 150 may start the offset cancellation operation by applying the ground voltage to the second sense signal S2 to turn off the second sense transistors ST21 and ST22. The control circuitry 150 may apply the driving voltage to the sense driving signal LA and the ground voltage to the complementary sense driving signal LAB. In one or more examples, the control circuitry 150 may maintain the first sense signal S1 and the isolation signal ISO to have the same levels as those when the charge sharing operation starts.

As the offset cancellation operation is performed, the voltage level of the first sense bit line SBL1 and the voltage level of the second sense bit line SBL2 may decrease because of offset noise in the first sense bit line SBL1 and the second sense bit line SBL2. For example, the offset cancellation operation may result in the determination of the offset noise, which is applied to the sense bit lines. In one or more examples, the voltage level of the first sense bit line SBL1 and the voltage level of the second sense bit line SBL2 may have a predetermined difference between the two voltage levels.

When the offset cancellation operation is performed in the sense amplifying circuitry 161, the first isolation transistor IT1 and the second isolation transistor IT2 may be off. Therefore, the charge sharing operation may continue between the first memory cell 111 and the first bit line BL1. Accordingly, the voltage level of the first bit line BL1 may keep increasing gradually.

When the sense amplifier 160 is used, the first isolation transistor IT1 and the second isolation transistor IT2 may be turned off while the charge sharing operation is performed between the first memory cell 111 and the first bit line BL1, and as the offset cancellation operation is performed in the sense amplifying circuitry 161, the speed at which sensing data stored in a memory cell is sensed may advantageously increase.

When the charge sharing operation is about to end (e.g., prior to termination of the charge sharing operation), the control circuitry 150 may apply a pre-charge voltage to the sense driving signal LA and the complementary sense driving signal LAB.

Sense Operation and Restore Operation

When the sense operation starts, the control circuitry 150 may apply the driving voltage to the isolation signal ISO. Accordingly, the first isolation transistor IT1 and the second isolation transistor IT2 may be turned on. In one or more examples, as the first isolation transistor IT1 and the second isolation transistor IT2 are turned on, the electric charges may move between the first memory cell 111 and the sense amplifying circuitry 161 and between the second memory cell 112 and the sense amplifying circuitry 161.

When the sense operation starts, the control circuitry 150 may apply the ground voltage to the first sense signal S1 and the driving voltage to the second sense signal S2. Furthermore, the control circuitry 150 may apply the pre-charge voltage to the sense driving signal LA and the complementary sense driving signal LAB.

When a predetermined amount of time has passed after the sense operation starts, the control circuitry 150 may apply the driving voltage to the sense driving signal LA and the ground voltage to the complementary sense driving signal LAB. Accordingly, a voltage level difference between the first bit line BL1 and the second bit line BL2 and a voltage level difference between the first sense bit line SBL1 and the second sense bit line SBL2 may be amplified. In one or more examples, because sensed data is the data 1, the voltage level of the first bit line BL1 may be higher than that of the second bit line BL2, and the voltage level of the first sense bit line SBL1 may be higher than that of the second sense bit line SBL2.

In one or more examples, the sense amplifier 160 may transmit the sensed data to the data input/output circuitry 170 to make the sensed data be output to the outside of the memory device 100. The sense amplifier 160 may restore, in a memory cell, the voltage of the first bit line BL1 according to the sensed data as a cell voltage.

Figure 5:
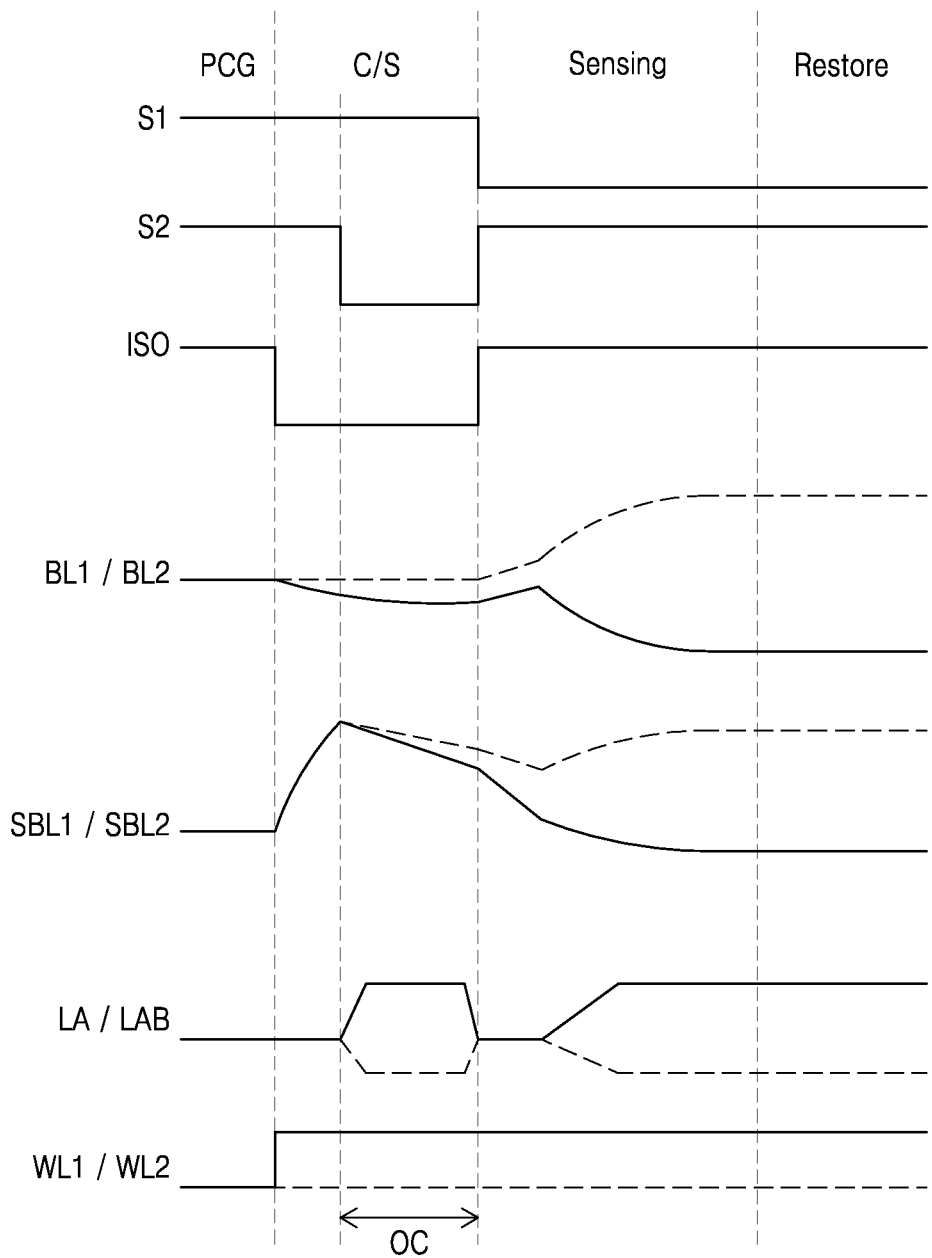
FIG. 5 is a timing diagram showing signals of a sense amplifier when data 0 is sensed by the sense amplifier, according to one or more embodiments.

FIG. 5 is a timing diagram showing signals of a sense amplifier when data 0 (e.g., logic low level) is sensed by the sense amplifier, according to one or more embodiments.

FIG. 5 shows flows of voltage levels of various signals and lines when data 0 stored in the first memory cell 111 is sensed. In the embodiment of FIG. 5, the control circuitry 150 may control the voltage levels of the first sense signal S1, the second sense signal S2, the isolation signal ISO, the sense driving signal LA, and the complementary sense driving signal LAB to be the same as those in the embodiment of FIG. 4. Furthermore, as data stored in the first memory cell 111 is sensed, the voltage level of the first word line WL1 and the voltage level of the second word line WL2 may be the same as those in the embodiment of FIG. 4. However, because the data stored in the first memory cell 111 is the data 0, the voltage level of each of the first bit line BL1, the second bit line BL2, the first sense bit line SBL1, and the second sense bit line SBL2 may different in FIG. 5 with respect to FIG. 4.

Pre-Charge Operation

When the pre-charge operation is performed, the control circuitry 150 may pre-charge the first bit line BL1, the second bit line BL2, the first sense bit line SBL1, and the second sense bit line SBL2 such that each of these lines have the same pre-charge voltage levels.

Charge Sharing Operation (Before the Offset Cancellation Operation Starts)

After the charge sharing operation starts, FIG. 5 corresponds to one or more embodiments in which the data 0 is stored in the first memory cell 111, and thus, a voltage level of the first cell capacitor CC1 may be lower than the voltage level of the first bit line BL1 pre-charged. Therefore, as the electric charges in the first bit line BL1 are transferred to the first cell capacitor CC1, the voltage level of the first bit line BL1 may gradually decrease. In one or more examples, the voltage level of the second bit line BL2 may still be the pre-charge voltage level.

When the charge sharing operation starts, the control circuitry 150 may increase the voltage level of the first sense bit line SBL1 and the voltage level of the second sense bit line SBL2 to the driving voltage level.

Charge Sharing Operation (after the Offset Cancellation Operation Starts)

As the offset cancellation operation is performed, the voltage level of the first sense bit line SBL1 and the voltage level of the second sense bit line SBL2 may decrease because of offset noise therein. In one or more examples, the voltage level of the first sense bit line SBL1 and the voltage level of the second sense bit line SBL2 may have a certain difference.

The charge sharing operation may continue between the first memory cell 111 and the first bit line BL1. Accordingly, the voltage level of the first bit line BL1 may keep decreasing gradually.

Sense Operation and Restore Operation

As the sense operation is performed, a voltage level difference between the first bit line BL1 and the second bit line BL2 and a voltage level difference between the first sense bit line SBL1 and the second sense bit line SBL2 may be amplified. In one or more examples, because sensed data is the data 0, the voltage level of the first bit line BL1 may be lower than that of the second bit line BL2, and the voltage level of the first sense bit line SBL1 may be lower than that of the second sense bit line SBL2.

Figure 6:
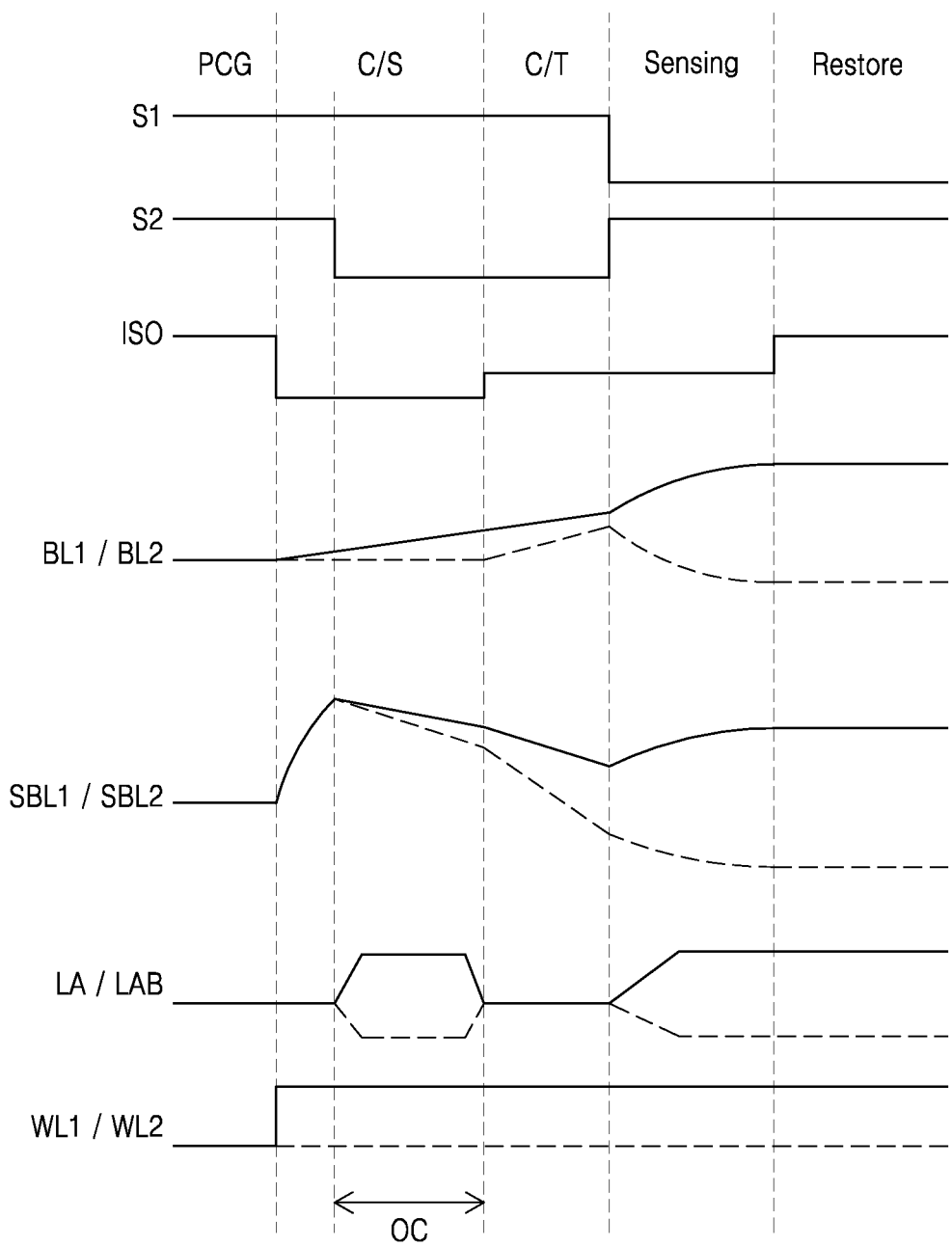
FIG. 6 is a timing diagram showing signals of a sense amplifier when data 1 is sensed by the sense amplifier, according to one or more embodiments.

FIG. 6 is a timing diagram showing signals of a sense amplifier when data 1 (e.g., logic level high) is sensed by the sense amplifier, according to one or more embodiments.

FIG. 6 shows flows of voltage levels of various signals and lines when data 1 stored in the first memory cell 111 is sensed. Unlike the embodiment of FIG. 4, in the embodiment of FIG. 6, the control circuitry 150 may control the pre-charge operation and the charge sharing operation to be performed, and after the pre-charge operation is performed, perform charge transfer operation (C/T) in the sense amplifier 160. In one or more examples, the pre-charge operation and the charge sharing operation are the same as in the embodiment of FIG. 4.

Charge Transfer Operation

When the charge transfer operation starts, the control circuitry 150 may apply a fine driving voltage to the isolation signal ISO. Accordingly, the first isolation transistor IT1 and the second isolation transistor IT2 may be finely turned on. In one or more examples, as the first isolation transistor IT1 and the second isolation transistor IT2 are finely turned on, electric charges may be transferred between the first memory cell 111 and the sense amplifying circuitry 161 and between the second memory cell 112 and the sense amplifying circuitry 161.

The control circuitry 150 may maintain the first sense signal S1 and the second sense signal S2 to have the same voltage levels as those during the charge sharing operation and may apply the pre-charge voltage to the sense driving signal LA and the complementary sense driving signal LAB.

When the first isolation transistor IT1 and the second isolation transistor IT2 are finely turned on, a decrement in the voltage level of the second sense bit line SBL2 increases, and thus, a difference between the voltage level of the first sense bit line SBL1 and the voltage level of the second sense bit line SBL2 may increase an additional amount before the sense operation. Accordingly, in the sense operation subsequently performed, the data stored in the first memory cell 111 may be accurately sensed.

Sense Operation and Restore Operation

When the sense operation starts, the control circuitry 150 may apply the ground voltage to the first sense signal S1 and the driving voltage to the second sense signal S2. In one or more examples, the control circuitry 150 may maintain the isolation signal ISO to have the fine driving voltage as in the charge transfer operation. The control circuitry 150 may apply the driving voltage to the sense driving signal LA and the ground voltage to the complementary sense driving signal LAB.

Accordingly, the voltage level difference between the first bit line BL1 and the second bit line BL2 and the voltage level difference between the first sense bit line SBL1 and the second sense bit line SBL2 may be amplified. In one or more examples, because sensed data is data 1, the voltage level of the first bit line BL1 may be higher than that of the second bit line BL2, and the voltage level of the first sense bit line SBL1 may be higher than that of the second sense bit line SBL2.

Figure 7:
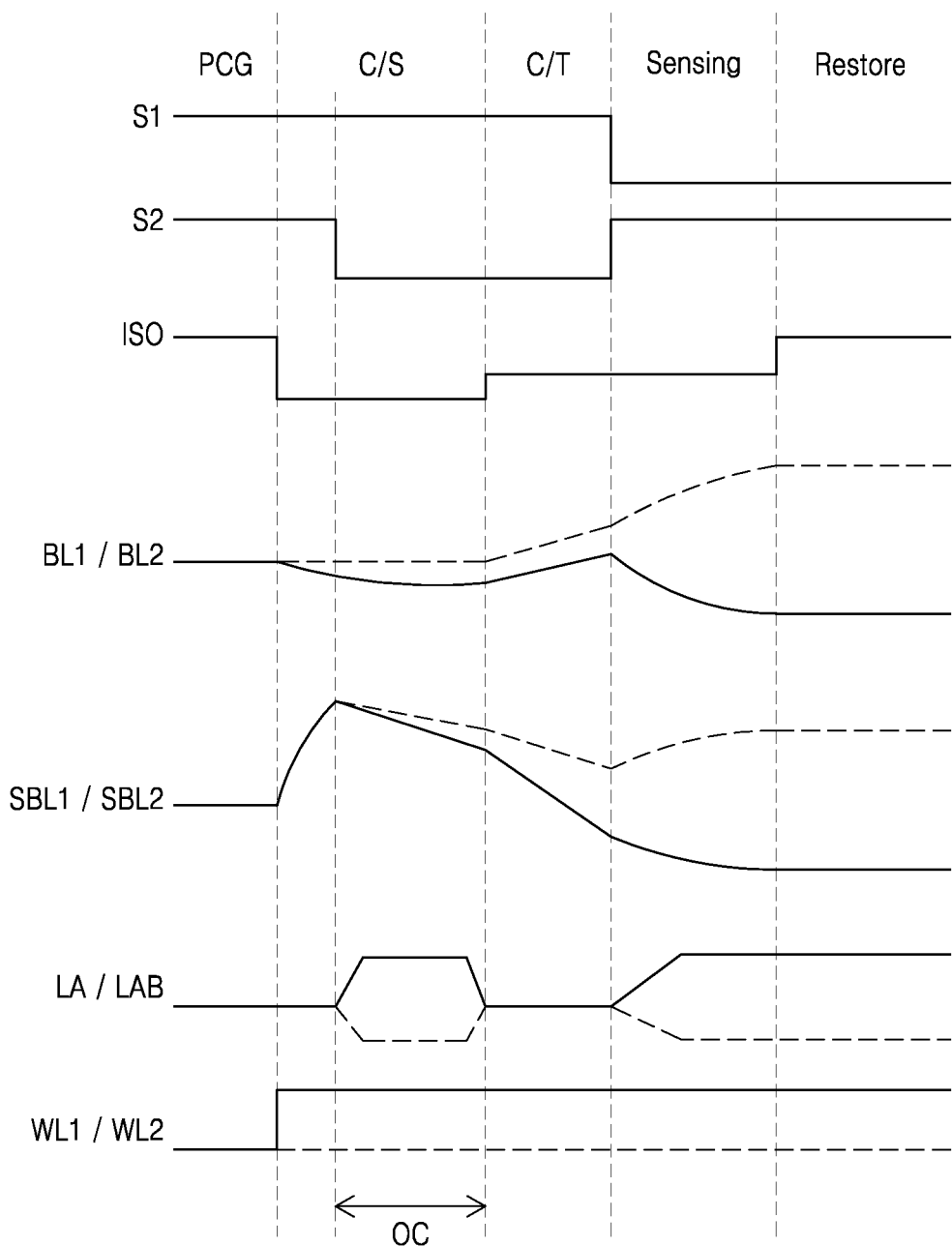
FIG. 7 is a timing diagram showing signals of a sense amplifier when data 0 is sensed by the sense amplifier, according to one or more embodiments.

FIG. 7 is a timing diagram showing signals of a sense amplifier when data 0 is sensed by the sense amplifier, according to one or more embodiments.

FIG. 7 shows flows of voltage levels of various signals and lines when data 0 stored in the first memory cell 111 is sensed. Unlike the embodiment of FIG. 5, in the embodiment of FIG. 7, the control circuitry 150 may control the pre-charge operation and the charge sharing operation to be performed and then the charge transfer operation to be performed in the sense amplifier 160. In one or more examples, the pre-charge operation and the charge sharing operation are the same as those in FIG. 5.

Charge Transfer Operation

The first sense signal S1, the second sense signal S2, the isolation signal ISO, the sense driving signal LA, and the complementary sense driving signal LAB, which are applied by the control circuitry 150 in the charge transfer operation, may be the same as those in FIG. 6.

In one or more examples, when the first isolation transistor IT1 and the second isolation transistor IT2 are finely turned on, a rate of decrease in the voltage level of the first sense bit line SBL1 increases, and thus, the difference between the voltage level of the first sense bit line SBL1 and the voltage level of the second sense bit line SBL2 may increases an additional amount before the sense operation. Accordingly, in the sense operation subsequently performed, the data stored in the first memory cell 111 may be accurately sensed.

Sense Operation and Restore Operation

The first sense signal S1, the second sense signal S2, the isolation signal ISO, the sense driving signal LA, and the complementary sense driving signal LAB, which are applied by the control circuitry 150 in the sense operation, may be the same as those in FIG. 6.

Since the signals are applied by the control circuitry 150, the voltage level difference between the first bit line BL1 and the second bit line BL2 and the voltage level difference between the first sense bit line SBL1 and the second sense bit line SBL2 may be amplified. In one or more examples, because the sensed data is data 0, the voltage level of the first bit line BL1 may be lower than that of the second bit line BL2, and the voltage level of the first sense bit line SBL1 may be lower than that of the second sense bit line SBL2.

Figure 8:
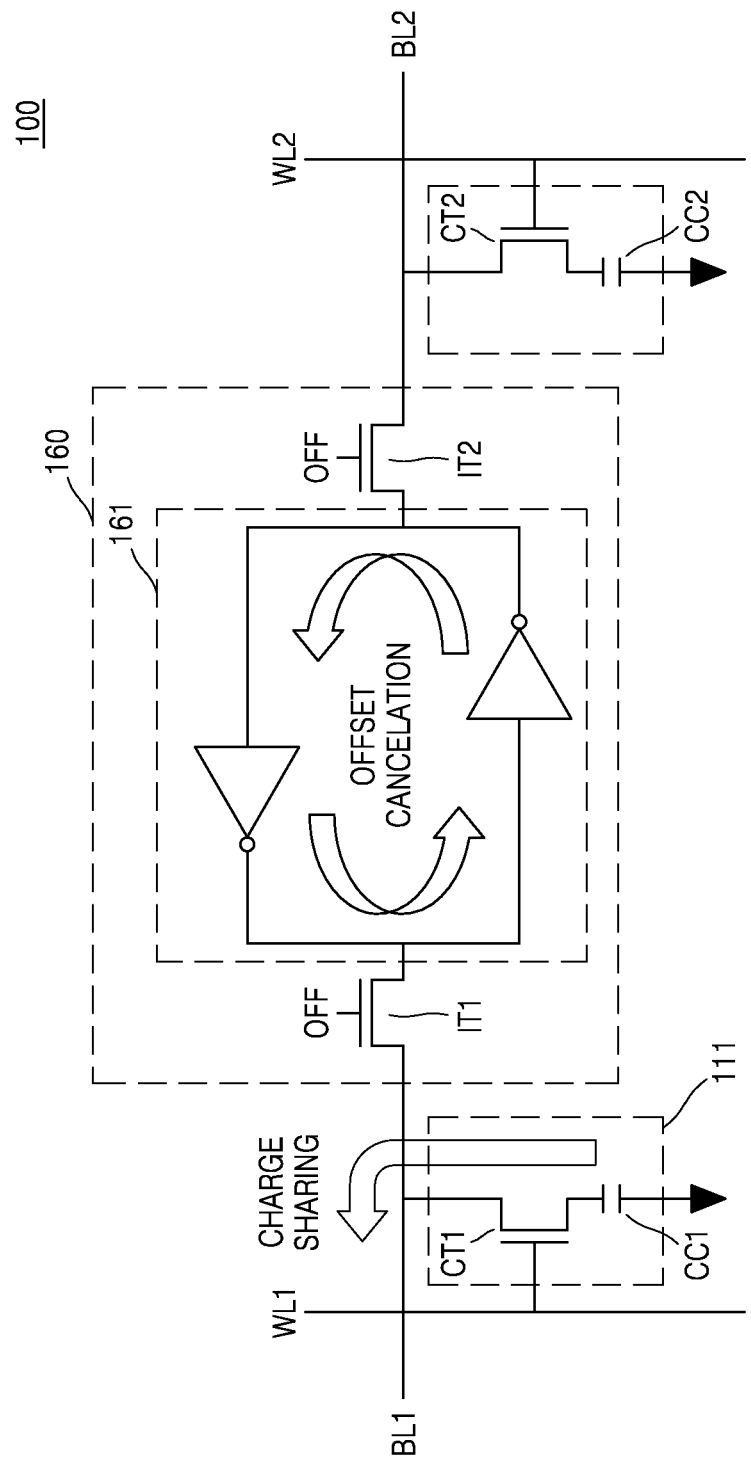
FIG. 8 is a circuit diagram showing a flow of electric charges when a charge sharing operation and an offset cancellation operation are performed in a memory device, according to one or more embodiments.

FIG. 8 is a circuit diagram showing a flow of electric charges when a charge sharing operation and an offset cancellation operation are performed in a memory device, according to one or more embodiments.

FIG. 8 shows a flow of electric charges when the charge sharing operation and the offset cancellation operation are performed in the first memory cell 111 and the sense amplifier 160 of the memory device 100.

When the charge sharing operation and the offset cancellation operation are performed, the first isolation transistor IT1 is off. As the first isolation transistor IT1 is off, the transfer of electric charges between the first bit line BL1 and the sense amplifying circuitry 161 may be blocked. Accordingly, although the offset cancellation operation is performed in the sense amplifying circuitry 161, the charge sharing operation between the first cell capacitor CC1 of the first memory cell 111 and the first bit line BL1 may be independently performed.

Furthermore, when the charge sharing operation and the offset cancellation operation are performed, the second isolation transistor IT2 is turned off, and thus, the transfer of the electric charges between the second bit line BL2 and the sense amplifying circuitry 161 may be blocked. Accordingly, although the charge sharing operation is performed in any of the first bit line BL1 and the second bit line BL2, the offset cancellation operation may be independently performed in the sense amplifying circuitry 161.

Figure 9:
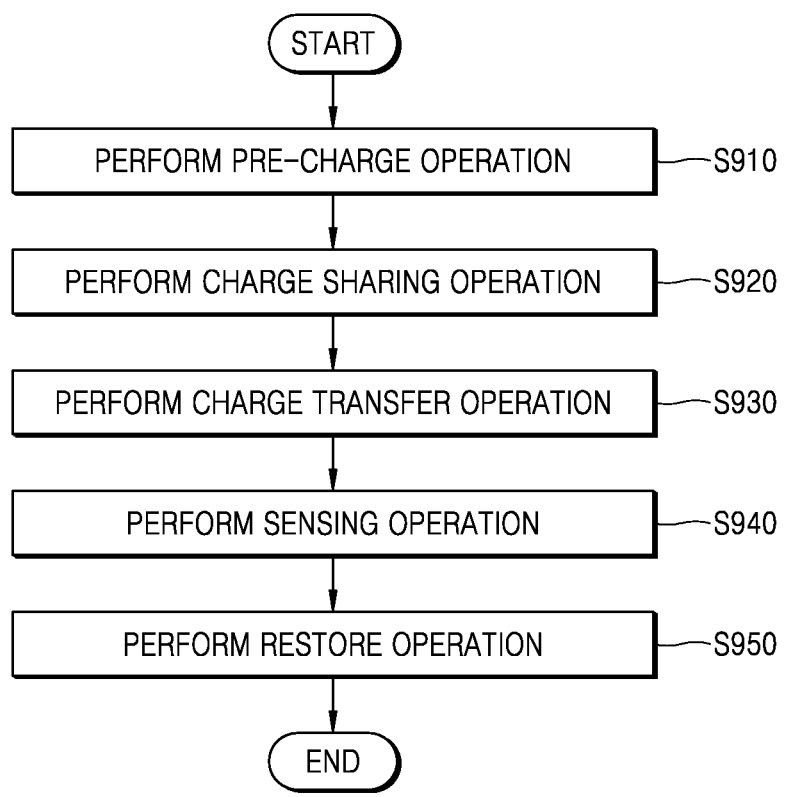
FIG. 9 is a flowchart of an operating method of a memory device, according to one or more embodiments.

FIG. 9 is a flowchart of an operating method of a memory device, according to one or more embodiments.

Referring to FIG. 9, in operation S910, the memory device 100 may perform a pre-charge operation. In the pre-charge operation, the memory device 100 may pre-charge the first bit line BL1, the second bit line BL2, the first sense bit line SBL1, and the second sense bit line SBL2 such that each of these lines have the same pre-charge voltage levels.

In operation S920, the memory device 100 may perform a charge sharing operation. In the charge sharing operation, the memory device 100 may use the control circuitry 150 to perform the charge sharing operation between a memory cell and a bit line and an offset cancellation operation in the sense amplifying circuitry 161 by turning off the first isolation transistor IT1 and the second isolation transistor IT2. A more detailed method of performing the charge sharing operation is described below with reference to FIG. 10.

In operation S930, the memory device 100 may perform a charge transfer operation. In the charge transfer operation, the memory device 100 may finely turn on the first isolation transistor IT1 and the second isolation transistor IT2 through the control circuitry 150. Accordingly, the memory device 100 may additionally increase a difference between a voltage level of the first sense bit line SBL1 and a voltage level of the second sense bit line SBL2 before a sense operation.

In operation S940, the memory device 100 may perform the sense operation. In the sense operation, the memory device 100 may sense data based on the voltage levels of the first sense bit line SBL1 and the second sense bit line SBL2 through the control circuitry 150 and transmit the sensed data to the data input/output circuitry 170.

In operation S950, the memory device 100 may perform a restore operation. In the restore operation, the memory device 100 may restore, in a memory cell, a bit line voltage according to the data as a cell voltage, where the data is sensed through the control circuitry 150 in the sense operation.

Figure 10:
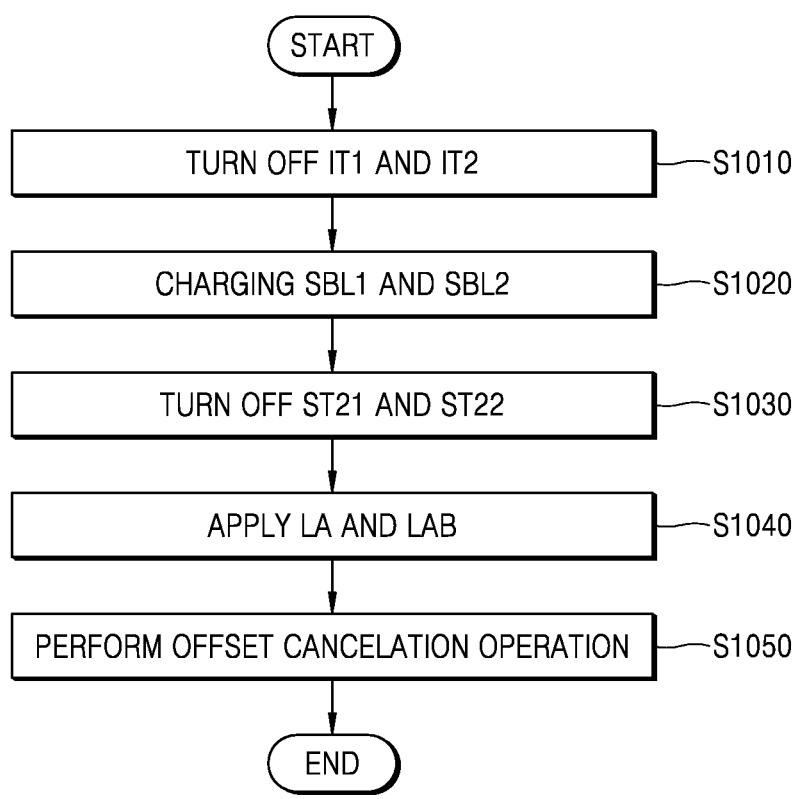
FIG. 10 is a flowchart of a process in which a charge sharing operation is performed in a memory device, according to one or more embodiments.

FIG. 10 is a flowchart of a process in which a charge sharing operation is performed in a memory device, according to one or more embodiments.

Referring to FIG. 10, a charge sharing operation is described in more detail.

In operation S1010, the memory device 100 may turn off the first isolation transistor IT1 and the second isolation transistor IT2. The memory device 100 may apply a ground voltage to the isolation signal ISO through the control circuitry 150 to turn off the first isolation transistor IT1 and the second isolation transistor IT2. Simultaneously with operation S1010, the charge sharing operation may be initiated between a memory cell connected to an activated word line and a bit line connected to the memory cell.

In operation S1020, the memory device 100 may charge the first sense bit line SBL1 and the second sense bit line SBL2 with a driving voltage. The memory device 100 may increase the voltage level of the first sense bit line SBL1 and the voltage level of the second sense bit line SBL2 to a driving voltage level through the control circuitry 150.

In operation S1030, the memory device 100 may turn off the third sense transistor ST21 and the fourth sense transistor ST22.

In operation S1040, the memory device 100 may apply the sense driving signal LA and the complementary sense driving signal LAB. The memory device 100 may apply a driving voltage to the sense driving signal LA and a ground voltage to the complementary sense driving signal LAB through the control circuitry 150.

In operation S1050, the memory device 100 may perform an offset cancellation operation. In one or more examples, because the first isolation transistor IT1 and the second isolation transistor IT2 are off, the offset cancellation operation may be performed in the sense amplifying circuitry 161 independently from operations performed in the memory cell.

When the operating method of the memory device 100, according to the one or more embodiments is used, as the offset cancellation operation is performed while the charge sharing operation is performed, the speed of sensing the data stored in the memory cell may be improved.

While various embodiments have been shown and described, it will be understood that various changes in form and details may be made therein without departing from the spirit and scope of the following claims.

What is claimed is:

1. A sense amplifier comprising:
a first isolation transistor connected to a first memory cell through a first bit line;
a second isolation transistor connected to a second memory cell through a second bit line; and
sense amplifying circuitry connected to the first memory cell through the first isolation transistor, and connected to the second memory cell through the second isolation transistor,
wherein the sense amplifying circuitry is configured to latch, to a pair of sense bit lines, data corresponding to a cell voltage stored in the first memory cell or the second memory cell,
wherein the sense amplifying circuitry is configured to perform an offset cancellation operation while a charge sharing operation is performed between the first memory cell and the first bit line or between the second memory cell and the second bit line,
wherein the first isolation transistor is turned on with a fine driving voltage by control circuitry to initiate a charge transfer operation after the charge sharing operation has been completed,
wherein the second isolation transistor is turned on with the fine driving voltage by the control circuitry to initiate the charge transfer operation after the charge sharing operation has been completed, and
wherein the fine driving voltage is a voltage level that is within a predetermined amount of a threshold voltage.

2. The sense amplifier of claim 1, wherein the first isolation transistor is turned off by the control circuitry in response to a start of the charge sharing operation, and
wherein the second isolation transistor is turned off by the control circuitry in response to the start of the charge sharing operation.

3. The sense amplifier of claim 1, wherein the pair of sense bit lines of the sense amplifying circuitry start being charged with a driving voltage by the control circuitry in response a to start of the charge sharing operation.

4. The sense amplifier of claim 3, wherein the sense amplifying circuitry starts the offset cancellation operation in response to the pair of sense bit lines being charged with the driving voltage.

5. The sense amplifier of claim 4, wherein the sense amplifying circuitry comprises a first pair of sense transistors and a second pair of sense transistors, and
wherein the second pair of sense transistors are turned off by the control circuitry in response to the pair of sense bit lines being charged with the driving voltage.

6. The sense amplifier of claim 1, wherein the fine driving voltage is set based on a voltage of the first bit line or the second bit line, and the threshold voltage is a threshold voltage of the first isolation transistor or the second isolation transistor.

7. A memory device comprising:
a first memory cell connected to a first bit line;
a second memory cell connected to a second bit line;
a first isolation transistor connected to the first memory cell through the first bit line;
a second isolation transistor connected to the second memory cell through the second bit line;
sense amplifying circuitry connected to the first memory cell through the first isolation transistor, and connected to the second memory cell through the second isolation transistor, and the sense amplifying circuitry configured to latch, to a pair of sense bit lines, data corresponding to a cell voltage stored in the first memory cell or the second memory cell; and
control circuitry configured to control the first isolation transistor, the second isolation transistor, and the sense amplifying circuitry such that an offset cancellation operation is performed in the sense amplifying circuitry while a charge sharing operation is performed between the first memory cell and the first bit line or between the second memory cell and the second bit line,
wherein the pair of sense bit lines of the sense amplifying circuitry are charged from a pre-charge voltage to a driving voltage by the control circuitry in response to a start of the charge sharing operation.

8. The memory device of claim 7, wherein the control circuitry is configured to turn off the first isolation transistor and the second isolation transistor, and activate a first word line connected to the first memory cell or a second word line connected to the second memory cell to initiate the charge sharing operation.

9. The memory device of claim 7, wherein, in response to charging the pair of sense bit lines from the pre-charge voltage to the driving voltage, the control circuitry is configured to turn off at least one transistor of a plurality of transistors included in the sense amplifying circuitry such that the offset cancellation operation is performed.

10. The memory device of claim 9, wherein the sense amplifying circuitry comprises a first pair of sense transistors and a second pair of sense transistors, and
when the pair of sense bit lines are charged with the driving voltage, the control circuitry is configured to turn off the second pair of sense transistors.

11. The memory device of claim 7, wherein the control circuitry is configured to control the first isolation transistor, the second isolation transistor, and the sense amplifying circuitry such that a sense operation and a restore operation are performed after the charge sharing operation has been completed.

12. The memory device of claim 7, wherein the control circuitry is configured to control the first isolation transistor and the second isolation transistor such that a charge transfer operation is performed after the charge sharing operation has been completed.

13. The memory device of claim 12, wherein the control circuitry is configured to turn on the first isolation transistor and the second isolation transistor at a fine driving voltage such that the charge transfer operation is performed, wherein the fine driving voltage includes a voltage value that is within a predetermined amount of a threshold voltage.

14. The memory device of claim 13, wherein the fine driving voltage is set based on a voltage of the first bit line or the second bit line and the threshold voltage is a threshold voltage of the first isolation transistor or the second isolation transistor.

15. The memory device of claim 12, wherein the control circuitry is configured to control the first isolation transistor, the second isolation transistor, and the sense amplifying circuitry such that a sense operation and a restore operation are performed after the charge transfer operation has been completed.

16. An operating method of a memory device comprising a first memory cell, a second memory cell, a sense amplifier, and control circuitry, the operating method comprising:

performing a pre-charge operation on a first bit line connected to the first memory cell, a second bit line connected to the second memory cell, and a pair of sense bit lines of the sense amplifier by turning on a first pair of sense transistors, a second pair of sense transistors, a first isolation transistor, and a second isolation transistor through the control circuitry, wherein the first pair of sense transistors, the second pair of sense transistors, the first isolation transistor, and the second isolation transistor are included in the sense amplifier; and performing a charge sharing operation between the first memory cell and the first bit line or between the second memory cell and the second bit line by turning off the first isolation transistor and the second isolation transistor through the control circuitry, wherein the performing of the charge sharing operation comprises:

charging the pair of sense bit lines from a pre-charge voltage to a driving voltage in response to a start of the charge sharing operation; and in response to charging the pair of sense bit lines to the driving voltage, performing an offset cancellation operation by turning off the second pair of sense transistors.

17. The operating method of claim 16, further comprising, after the charge sharing operation has been completed, performing a charge transfer operation by turning on the first isolation transistor and the second isolation transistor with a fine driving voltage through the control circuitry, wherein the fine driving voltage has a voltage value that is within a predetermined amount of a threshold voltage.

18. The operating method of claim 17, wherein the fine driving voltage is set based on a voltage of the first bit line or the second bit line and the threshold voltage is a threshold voltage of the first isolation transistor or the second isolation transistor.

* * * * *